(12) United States Patent
Kim (10) Patent No.: US 8,111,280 B2
(45) Date of Patent: Feb. 7, 2012

(54) VIDEO CONFERENCE SYSTEM AND METHOD IN A COMMUNICATION NETWORK

(75) Inventor: Tae-Seong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1352 days.

(21) Appl. No.: 11/672,381

(22) Filed: Feb. 7, 2007

(65) Prior Publication Data

US 2007/0200925 A1 Aug. 30, 2007

(30) Foreign Application Priority Data

Feb. 7, 2006 (KR) .................. 10-2006-0011679

(51) Int. Cl.
*H04N 7/14* (2006.01)
(52) U.S. Cl. ............... 348/14.01; 348/14.02; 348/14.09
(58) Field of Classification Search .... 348/14.01–14.16, 348/169, 118, 275; 345/204, 629, 645; 382/103, 382/190, 294

See application file for complete search history.

(56) References Cited

U.S. PATENT DOCUMENTS

| | | | |
|---|---|---|---|
| 7,612,794 B2 * | 11/2009 | He et al. | 348/14.08 |
| 7,728,866 B2 * | 6/2010 | Currivan et al. | 348/14.01 |
| 2002/0018070 A1 | 2/2002 | Lanier | |
| 2004/0240708 A1 * | 12/2004 | Hu et al. | 382/103 |
| 2004/0240740 A1 | 12/2004 | Ohba | |
| 2005/0204287 A1 | 9/2005 | Wang | |
| 2005/0286799 A1 * | 12/2005 | Huang et al. | 382/275 |

FOREIGN PATENT DOCUMENTS

| | | |
|---|---|---|
| CN | 1499816 | 5/2004 |
| EP | 1 473 937 A1 | 11/2004 |
| JP | 08-131252 | 5/1996 |
| JP | 2003-244425 | 8/2003 |
| JP | 2004-171543 | 6/2004 |
| JP | 2004-178163 | 6/2004 |
| JP | 2004-297274 | 10/2004 |
| JP | 2005-130356 | 5/2005 |
| JP | 2005-242566 | 9/2005 |
| WO | WO 99/57900 | 11/1999 |

OTHER PUBLICATIONS

Ma Lihong et al., "A Study on Facial Feature Extraction and Automatic Location," Journal of South China University of Technology (Natural Science Edition), Apr. 2000, vol. 28, No. 4, pp. 97-98.

* cited by examiner

*Primary Examiner* — Melur Ramakrishnaiah
(74) *Attorney, Agent, or Firm* — Lee, Hong, Degerman, Kang & Waimey (57) ABSTRACT

Image concealment video conference allows the user to conceal their image with an overlay image that will be shown in real-time to a peer during video conference. The real-time video concealment processes an image in a video stream, where the video stream is communicated from one video conference unit to a second video conference unit over a communication network. The real-time concealment is performed by first determining the prominent biometric features of the users image to recognize nodal points on a human face. The system then modifies the users image using a second image, so that at least one of the nodal points in the users image is covered by the second image. This modified image is then transmitted in real time to a peer in a video conference session.

17 Claims, 12 Drawing Sheets

VIDEO CONFERENCE SYSTEM AND METHOD IN A COMMUNICATION NETWORK

CROSS-REFERENCE TO RELATED APPLICATION

This disclosure relates to a subject matter contained in priority Korean Patent Application No. 10-2006-0011679, filed on Feb. 7, 2006, which is herein expressly incorporated by reference in its entirety.

FIELD OF THE INVENTION

The present disclosure relates to a video conference system and method in a communication network.

BACKGROUND

Video conferencing allows the parties in a video conference to use communication terminals to view each other during a video conference session. In Wideband Code Division Multiple Access (WCDMA), the 3G-324M or H.324 protocol is used to support video conferencing (also see 3GPP TS 26.111).

In general, the H.324 is used in telephone networks when transmitting or receiving audio, video or other types of data. The H.324 is suitable for video conferencing in most communication environments and can be used to support video conferencing in a mobile communication network, as well.

Figure 1:
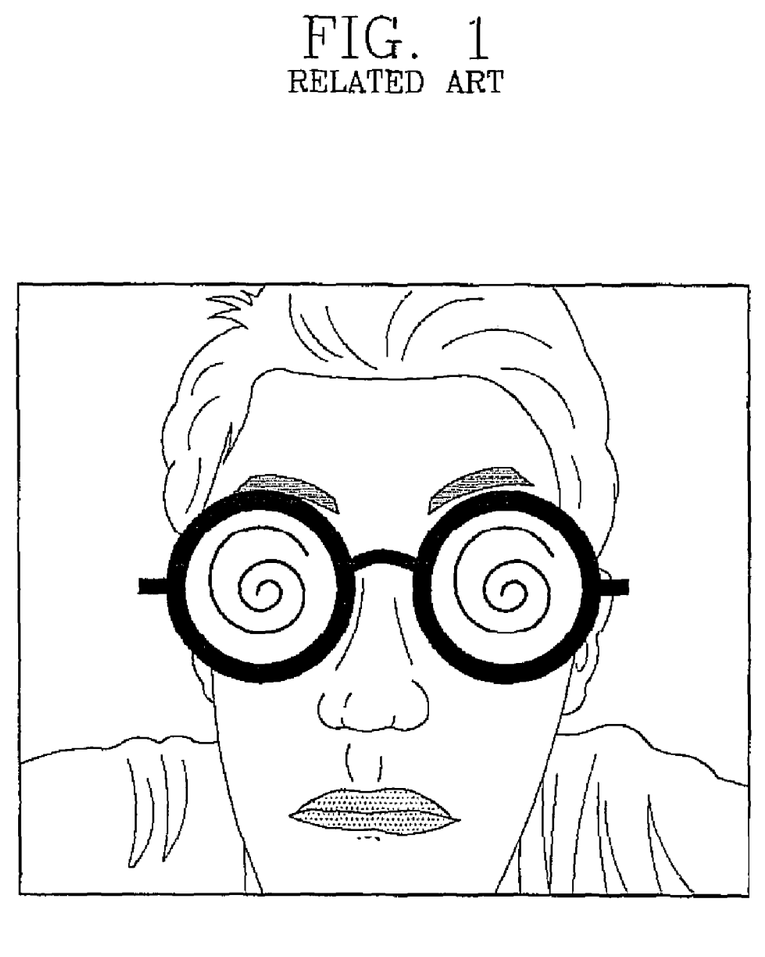
FIG. 1 shows an example of a replacement image used during a video conference.

Current video conference protocols allow for the user to select a random image instead of the user's image, if the user does not wish to show his own face or image during the video conference to the other party. FIG. 1 shows an exemplary image used during a video conference. Accordingly, if the user wishes to hide user's identity, then the user can select a random image to replace the user's image.

Thus, the present teleconference systems allow the user to conceal his identity by displaying a still image during the video conference. This method, however, defeats the purpose of using a video conference, as a video conference is for the purpose of capturing and displaying streaming media. Methods and systems are needed that can overcome the aforementioned problems.

SUMMARY

A video conferencing system and method is provided, wherein a video stream is communicated from one video conference unit to a second video conference unit over a communication network. The prominent biometric features of a user's image in the video stream are processed to recognize nodal points of a human face. The system modifies the user's image using a second image, so that at least one of the nodal points in the user's image is covered by the second image. This modified image is then transmitted in real time to a peer using video conference.

The features and advantages described in this disclosure and in the following detailed description are not all-inclusive, and particularly, many additional features and advantages will be apparent to one of ordinary skill in the relevant art in view of the drawings, specification, and claims hereof.

DETAILED DESCRIPTION OF EXEMPLARY EMBODIMENTS

In accordance with embodiment, during a teleconferencing session, a user is provided with an option to overlay an image (e.g., graphics, visual decoration, etc.) over the captured video being streamed to a second party. Providing this option is an improvement over previously known or used video conference techniques whereby a still image (e.g., still photo, a graphical image, wallpaper, etc.) is shown during video conference, when the user does not wish to show his real-time image.

In one embodiment, an overlay or a decorative image is added for the purpose of disguising or hiding a user's identity. In alternative embodiments, adding an image may be for the purpose of visually enhancing the streaming video or entertainment.

The adding of overlay image or decorative images to a real-time video of the user would be more aesthetically pleasing than simply providing a still image during video conference. As such, the user's real-time movements captured during video conference can be shown with an overlay image or graphics that are superimposed thereon and graphically processed to follow along with the user's movements, to thus create a visual effect as if the user is, for example, wearing the object in the overlay image or graphics.

In accordance with one embodiment, the overlay process comprises extracting particular features of a user's face that are captured during the video conference, tracing or forming one or more reference areas using the extracted features, matching a reference area of an overlay image and the traced reference area, and including the overlay image in the streaming video.

Figure 2:
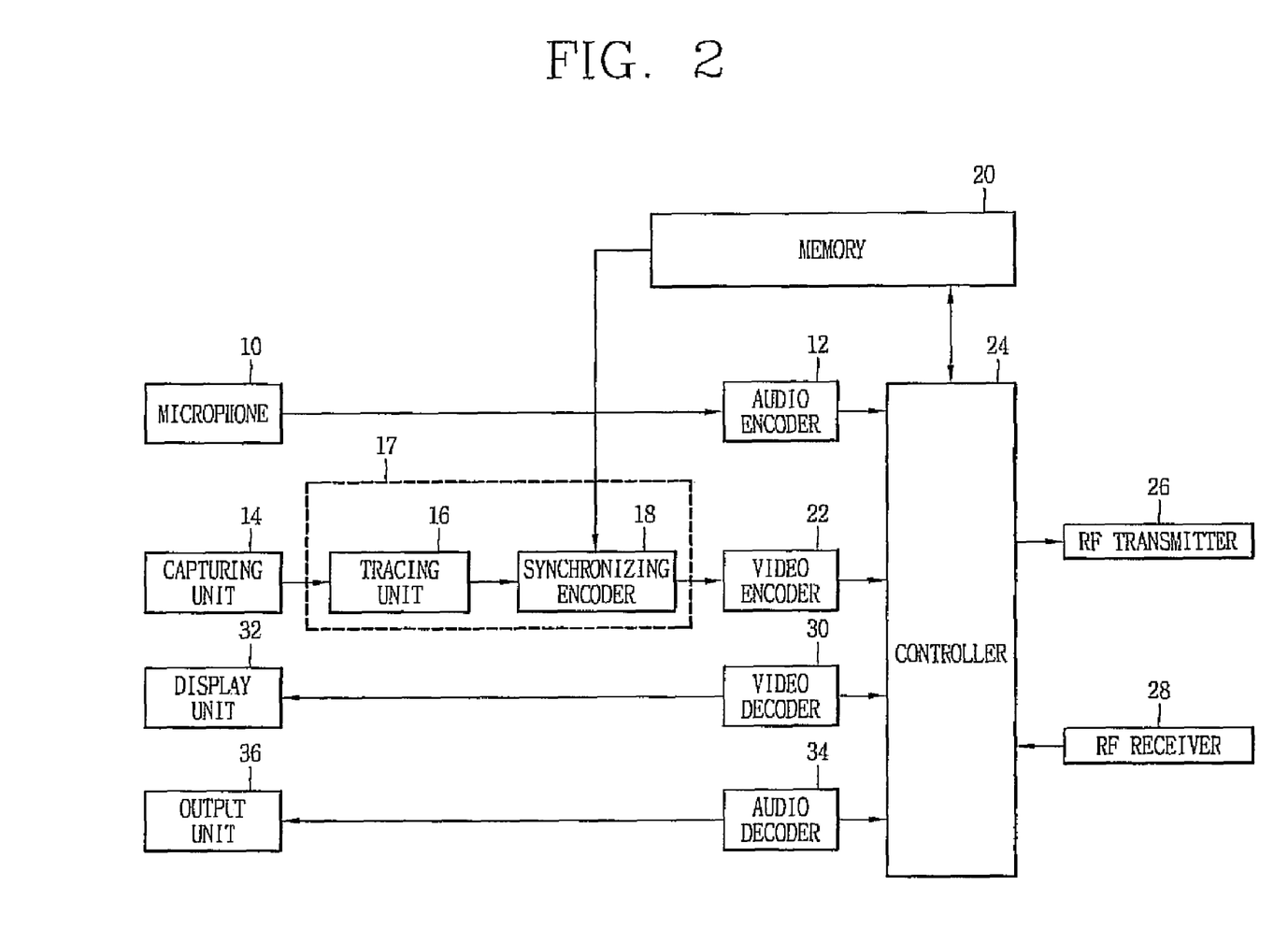
FIG. 2 is a block diagram showing a video telephony apparatus of a mobile communications terminal in accordance with this disclosure.

Referring to FIG. 2, a video conference terminal comprises a microphone 10 that obtains voice inputs, an audio encoder 12 that encodes the obtained voice inputs, a capturing unit 14 that captures an image, a synthesizing unit 17 which includes a tracing unit 16 that extracts certain features from the captured image and traces a reference area based on the extracted features, and a synchronizing unit 18 that synchronizes the traced reference area of the captured image with a reference area of an image for decoration (referred to as a 'decoration image' hereafter) stored in a memory to create a combined image.

In some embodiments, the video conference terminal may further comprise a video encoder 22 that encodes the synchronized image, a controller 24 that synchronizes the voice signal outputted through the audio encoder 12 with an image outputted from the video encoder 22 and controls a series of operations of various components, a RF transmitter 26 that transmits image and voice data, and a RF receiver 28 that receives image and voice data received from a communication network while video conference is in progress.

An audio decoder 34 that decodes the voice file received through the RF receiver 28 under the control of the controller 24, an output unit 36 that outputs the decoded voice, a video decoder 30 that decodes the image file received through the RF receiver 28 under the control of the controller 24, and a display unit 32 that displays the decoded image may be also included.

Figure 3:
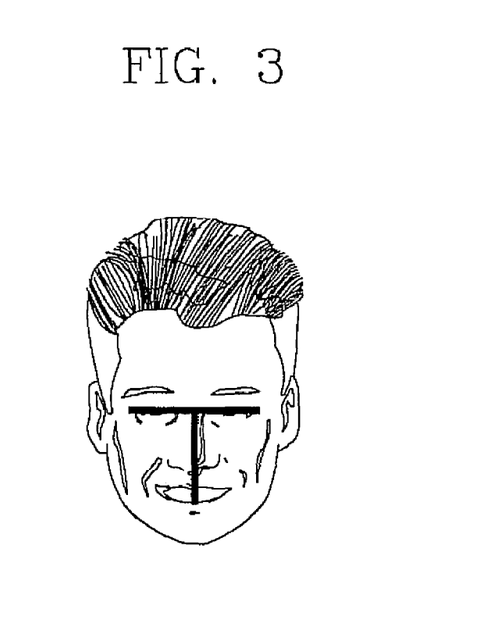
FIG. 3 is an exemplary view showing how to extract features of a user's face in accordance with one embodiment.

FIG. 3 is an exemplary view showing how to recognize facial features of a user's image in accordance with one embodiment. In one embodiment, facial features are extracted from the image and a reference area is determined based on the extracted features. To extract the facial features or candidate portions (e.g., eyes, nose, mouth, etc.) are determined within certain image regions based on color, brightness or other information. Certain facial features (e.g., eyes, nose, mouth, etc.) are identified based on geometrical information associated with such features.

In one embodiment, a reference area is marked, in the shape of a cross, for example, by using one line to connect the user's left and right eyes and another line to connect the user's nose and mouth. If the search for portions to be used for setting the reference area within the candidate portions (e.g., eyes, nose, mouth, etc.) is unsuccessful, further image processing is performed by expanding the candidate portions to ensure a wider search region.

Since the extraction of facial features and the tracing of the reference area are performed in real-time during the video conference, even if the user moves while video conference is in progress, the features of the user's face can still be appropriately extracted, and accordingly the reference area can be traced based on the extracted features.

Referring to FIGS. 2 and 3, when the user is in a video conference session, the user's voice and image are obtained respectively by the microphone 10 and the capturing unit 14 (e.g., a camera). The voice obtained through the microphone 10 is encoded by the audio encoder 12 to be transmitted to a another terminal through the RF transmitter 26 under the control of the controller 24. The image obtained by the capturing unit 14 is transmitted to the tracing unit 16. The tracing unit 16 extracts the facial shape from the image received from the capturing unit 14 to determine candidate portions within the region of the extracted face shape based on information related to color, brightness or other characteristics.

Upon determining the candidate portions, the tracing unit 16 identifies the portions corresponding to eyes, nose, mouth, and the like, based on geometric information or factors related to the determined candidate portions. Based on the geometrical form or information, the tracing unit 16 determines a reference area, preferably in the shape of a cross, or other geographic shapes, by connecting the eyes, the nose and the mouth in the user's image.

The tracing unit 16 calculates information regarding the angles, inclinations, movements and rotation directions of the traced reference area according to the user's movements during video conference, and transmits the information to the synchronizing unit 18. According to the calculated information for the reference area received from the tracing unit 16, the synchronizing unit 18 synchronizes the image obtained by the capturing unit 14 with a decoration image. In one embodiment, the decoration image may be, for example, a still or moving image, photo, graphics, animation or an equivalent thereof stored in the memory 20.

As such, in one embodiment, the information regarding the angle, inclination, movement and rotation direction of the reference area can be continuously detected, traced, and calculated in real-time, as the user moves while video conference is in progress.

In one embodiment, the reference area of the user's face is matched with the reference area of the decoration image to create a combined image obtained. The image transmitted from the tracing unit 16 and the decoration image stored in the memory 20 are preferably synchronized by the synchronizing unit 18. The synchronized image is sent to the video encoder 22. The video encoder 22 encodes the synchronized image under the control of the controller 24 and then sends the encoded image to the RF transmitter 26. The RF transmitter 26 then transmits the encoded image to another terminal through an antenna, for example.

In certain embodiments, when an image including a third party's face and voice information are received from the third party through the RF receiver 28, while video conference is in progress, the received voice and image are sent to the audio decoder 34 and the video decoder 30, respectively, under the control of the controller 24. The audio decoder 34 decodes the received voice and outputs the decoded voice through the output unit 36 such as a speaker, while the video decoder 30 decodes the received image and displays the decoded image on the display unit 32.

Figure 4:
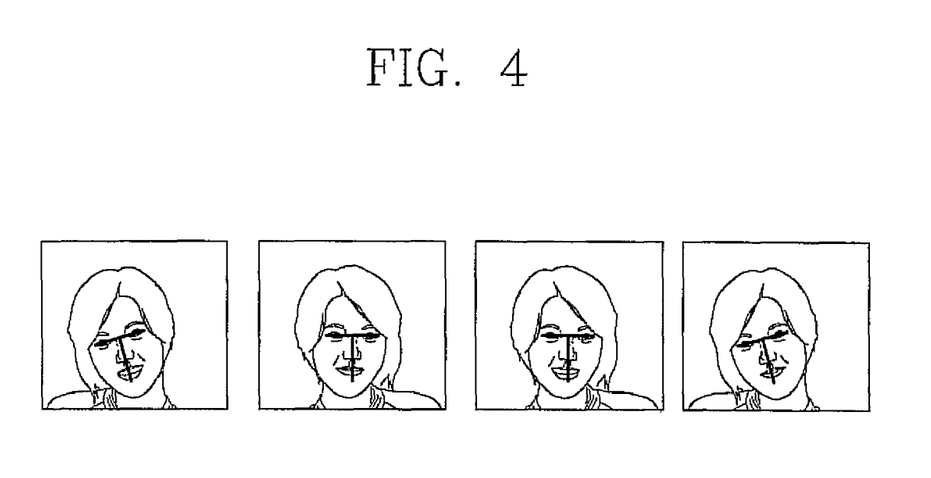
FIG. 4 is an exemplary view showing how to extract features of a user's face and trace a reference area in accordance with one embodiment.

FIG. 4 is an exemplary view showing how to extract features of a face and trace a reference area in accordance with one embodiment. The features of the user's face can be extracted and traced by using the method shown in FIG. 3 even if the user moves during the video conference.

Figure 5:
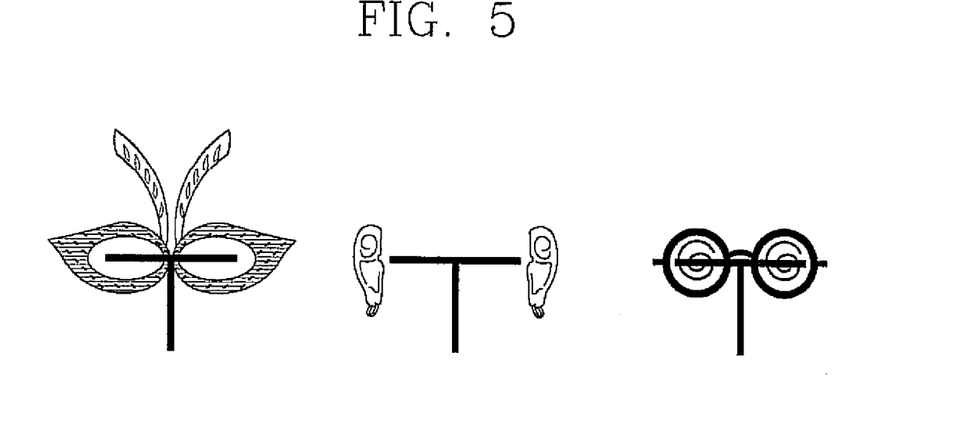
FIG. 5 is an exemplary view of applying a decoration image in accordance with one embodiment.

FIG. 5 is an exemplary view of applying a decoration image in accordance with one embodiment. Several shapes such as small masks, earrings, or glasses can be used as decoration images which can be used to decorate the user's face during a video conference. Referring to FIG. 3, the reference area in the shape of a cross, for example, is matched with the reference area for a decorative image, thereby applying such decoration onto the user's face during the video conference.

Figure 6:
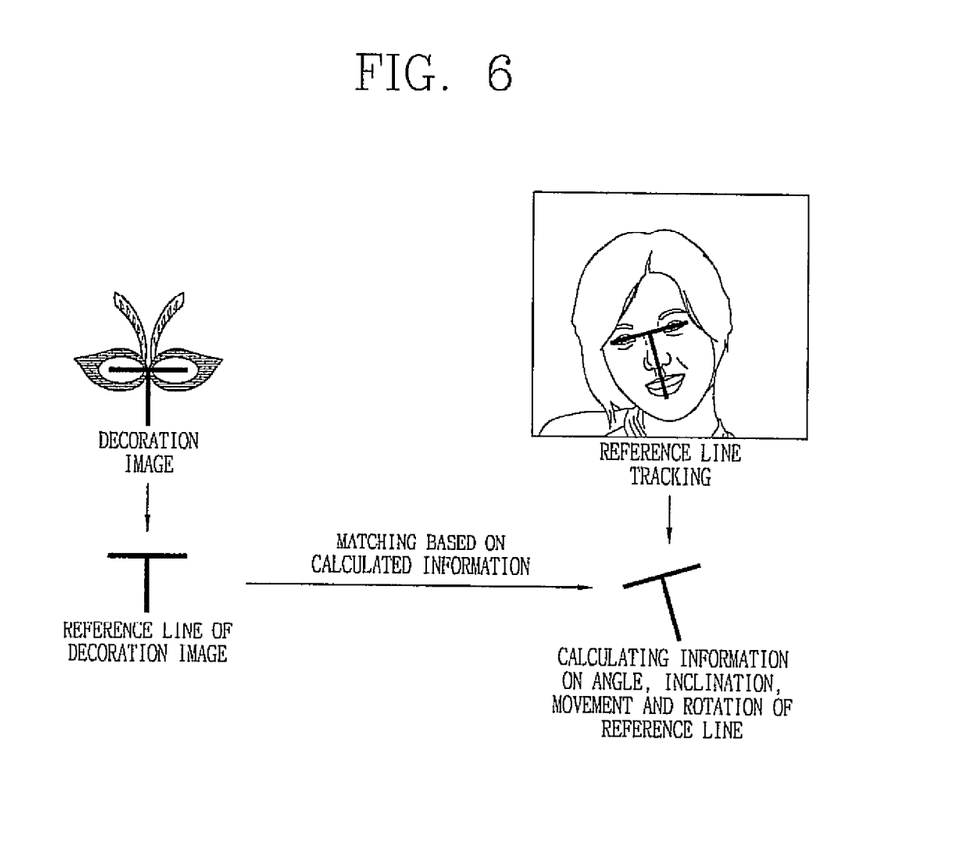
FIG. 6 is an exemplary view showing a synchronization method for applying a decoration image onto a user's face image in accordance with one embodiment.

FIG. 6 is an exemplary view showing a synchronization method for applying a decoration image to a user's image in accordance with one embodiment. The reference area is traced on the user's image during video conference by using the method shown in FIG. 3, so as to calculate information related to the traced reference area such as angle, inclination, movement and rotation direction. Comparison is performed, using the calculated information, between the reference area applied to the decoration image and the reference area traced on the user's face, thus to synchronize the reference area applied to the decoration image for the decoration with the reference area traced on the user's face image.

Figure 7:
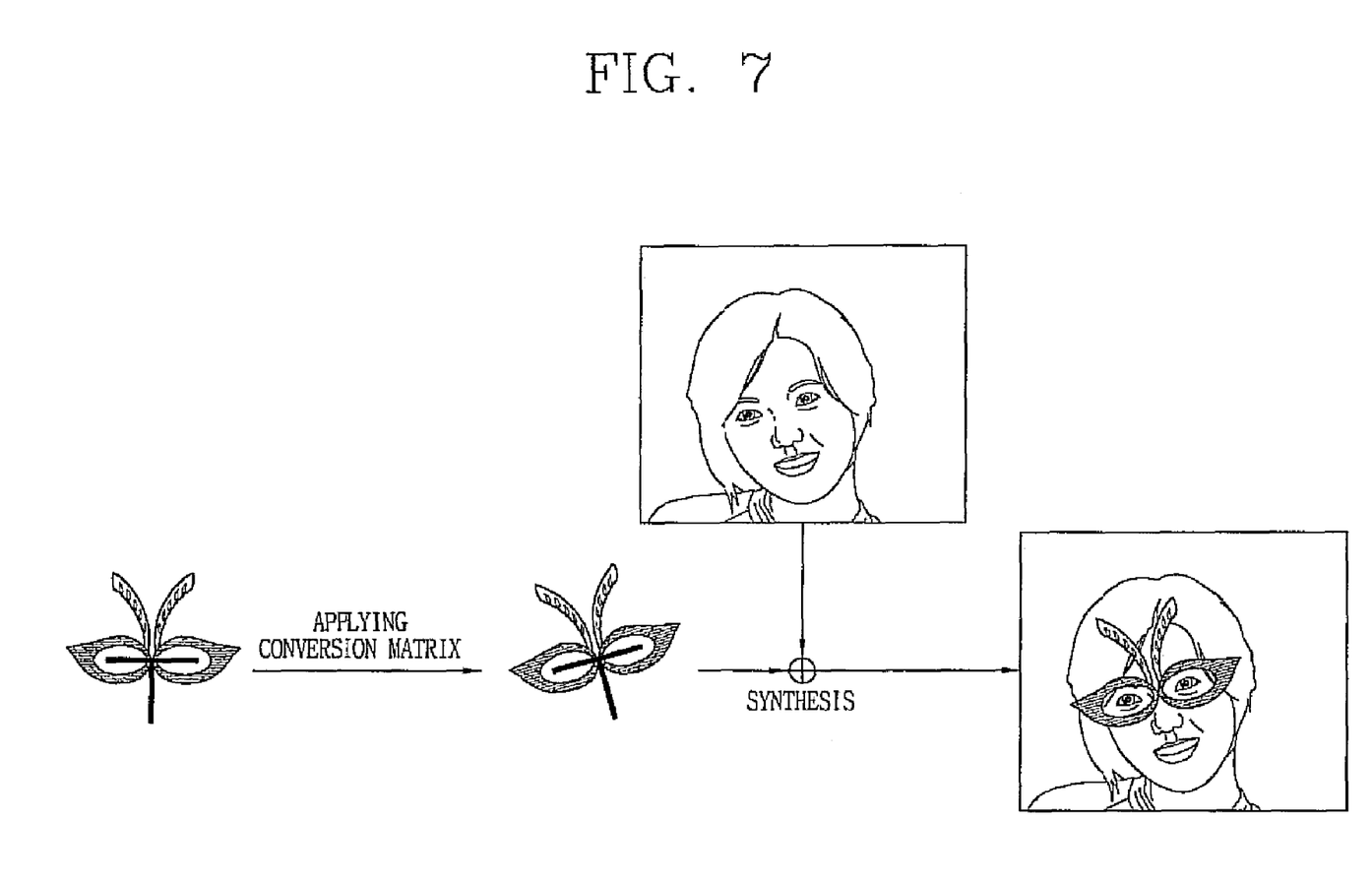
FIG. 7 is an exemplary view of combining a decoration image and a user's face image in accordance with one embodiment.

FIG. 7 is an exemplary view for synthesizing a decoration image and a face in accordance with one embodiment. After matching the reference area of the decoration image with the reference area traced on the user's face based on the information regarding angle, inclination, movement, and rotation direction of the traced reference area, such reference areas are synthesized, so as to preferably obtain a moving image decorated with the decoration image depending on the synchronized reference areas, as shown in FIG. 7.

As such, the reference area corresponding to the user's image is traced in real-time during video conference, and the information related to the reference area such as angle, inclination, movement and rotation direction are calculated. Accordingly, by applying the calculated information to the decoration image, the decoration image can move along together with the user's movements.

Figure 8:
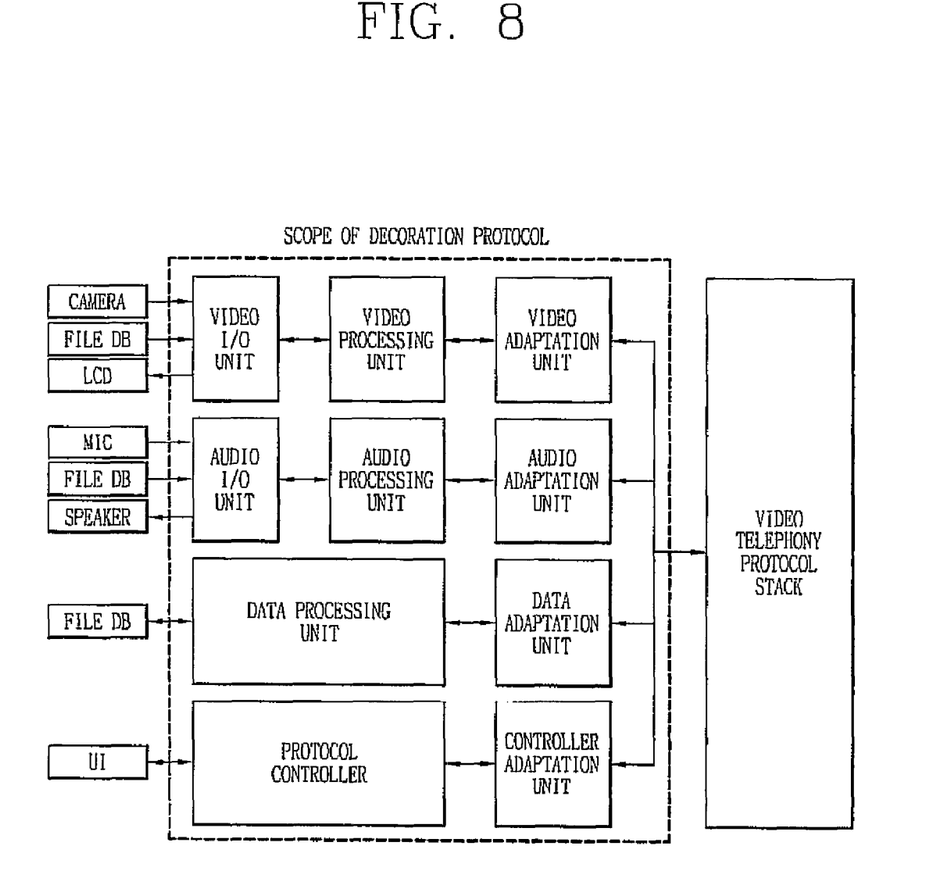
FIG. 8 is a block diagram showing an exemplary decoration protocol for decoration with an image in accordance with one embodiment.

FIG. 8 is a block diagram showing decoration image protocols for performing decoration with an image in accordance with one embodiment. The decoration image protocols may include input/output (I/O) units set having a video I/O unit and an audio I/O unit for inputting/outputting data such as image and voice, a processing units set having a video processing unit, an audio processing unit and a data processing unit for processing the inputted/outputted data, a transmission protocol for the inputted/outputted data, an adaptation units set for managing interfaces of decoration protocols, and a protocol controller for managing the decoration protocols between transmitting and receiving terminals.

The video I/O unit of the I/O units converts video transmission information in several formats, which includes images inputted through a camera and/or images stored in a memory into forms suitable for requirements of the video processing unit and transmits the converted information to the video processing unit. The video I/O unit also receives video data transmitted from the video processing unit and/or outputs processing information onto a display unit or stores the processing information. The audio I/O unit converts audio transmission information in several forms which includes information obtained from voice inputted through the microphone and files stored in the terminal into forms suitable for requirements of the audio processing unit and transmits the converted information to the audio processing unit. The audio I/O unit also receives audio transmitted from the audio processing unit and/or outputs processing information to the output unit (e.g., speaker, receivers earphone, etc.) or stores the processing information.

The video processing unit of the processing unit set processes data inputted from a decoder when transmitting video information, and processes data to be transmitted to an encoder when receiving the video information. The video processing unit may include a module which handles transmission of alternate images, decoration of transmitted/received images, storing of video (moving images), capturing of screen, recognition of faces, tracing (tracking) and the like, and may also further include a user's video processing module.

The audio processing unit processes data inputted from a decoder when transmitting audio information, and processes data to be transmitted to an encoder when receiving the audio information. The audio processing unit may include a module which handles transmission of alternate voice, manipulation of the transmitted/received voice (e.g., modulation, synthesis and recognition), storing of voice data during a call, and the lice, and may also further include a user's audio processing module.

The data processing unit manages data information transmitted during video conference, and prepares resources to be used in the video processing unit and the audio processing unit. The data processing unit may also be used as a protocol for data transmissions such as photos, moving images, music files, and the like, during video conference. The data processing unit may also provide interfaces for storing data in memory for future reading and writing of data.

The protocol controller controls the state of a decoration layer and operations of the video, audio, and data processing units with transmitting and receiving information with the protocol controller of a third party's terminal with respect to the operation of image decoration during video conference.

Figure 9:
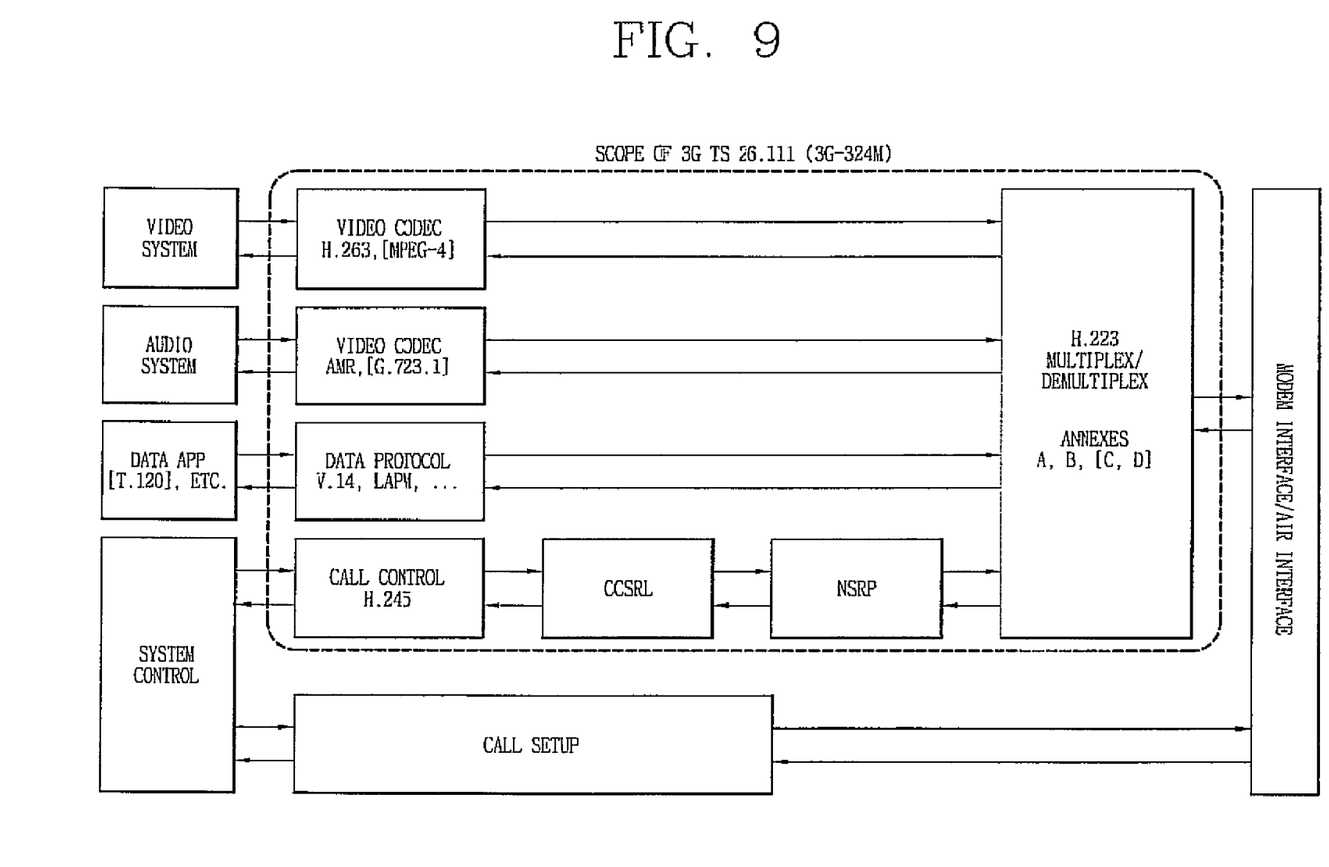
FIG. 9 shows an exemplary architecture of H.324M protocol for transmitting an image having a decoration image added thereto in accordance with one embodiment.

FIG. 9 shows an exemplary architecture of H.324M protocols for transmitting an image decorated with another image in accordance with one embodiment. The H.324M protocols for transmitting a currently displayed image (e.g., a real-time image, a moving image, a video clip, etc.) decorated with a second image (e.g., graphics, moving image, animation, etc.) in accordance with one embodiment may include a video codec (e.g., H.263 or MPEG4) which manages transmission/reception of image (video) information and processes the information, an audio codec (e.g., AMR (Adaptive Multi-Rate) or G.723.1) which manages transmission/reception of audio information and processes the information, a call control which manages both a function related to a connection of a video conference protocol and a control related function, and a data protocol which provides a function of transmitting data during video conference.

The H.324M protocols may further include a H.223 multiplexer which multiplexes data outputted from the video and audio codecs. CCSRL (Control Channel Segmentation and Reassembly) is a SAR (Segmentation And Reassembly) embodying method of a control frame defined in ITU-T (International Telecommunications Union-Telecommunication Standardization Sector) recommendation H.324 Annex C, which supports the stable exchange of H.245 messages. The maximum size of a NSRP command, used for packaging CCSRL segments, is 2048 octets.

Figure 10:
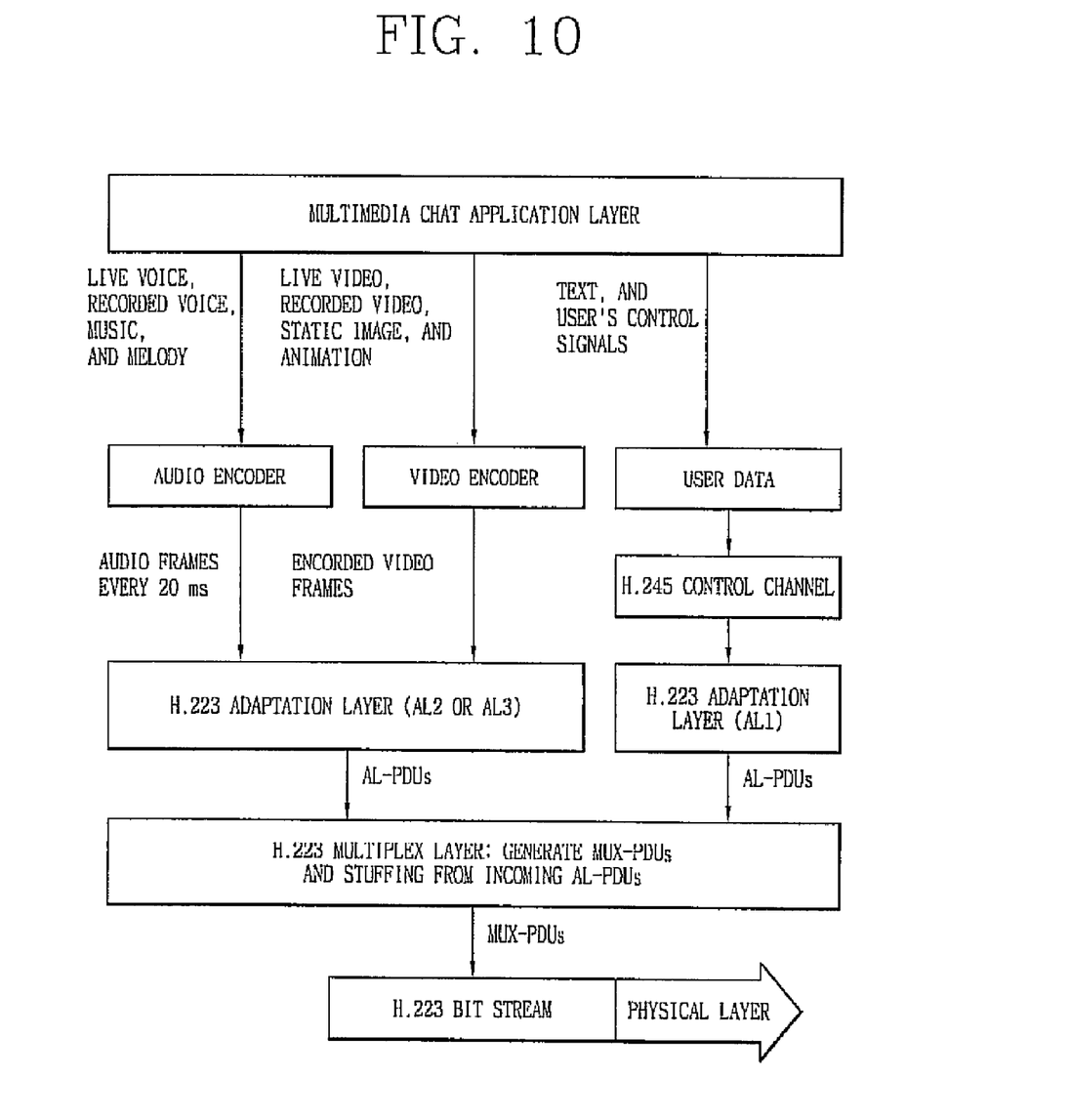
FIG. 10 is a block diagram showing a multimedia application layer which communicates multimedia data while a video conference is in progress, in accordance with one embodiment.

FIG. 10 is a block diagram showing a multimedia application layer which transmits/receives multimedia data during video conference in accordance with one embodiment. A user data layer using an audio encoder receives live voice signal data which may be inputted through a microphone in real-time during video conference, a voice recording pre-stored in a terminal before conducting video conference, and/or audio such as music distributed by terminal manufacturers (or service providers) or downloaded by the user into his terminal via the Internet.

A user data layer using a video encoder receives real-time decorated images (e.g., still image, animation, graphics, etc.) during video conference, video (moving images) that a terminal manufacturer distributes or that a user stores in his terminal by using a camcorder function thereof, images captured by the camera, and animation clips. A user data layer using a H.245 protocol receives text and control signals, which are used to conditionally control a third party's terminal (e.g., controlling a vibration mode of a third party's terminal, controlling a keypad thereof, etc.).

As shown in FIG. 10, AL-PDUs (Protocol Data Units) are generated from the data encoded through the audio and video encoders by using AL2 (Adaptation Layer 2) or AL3 of H.223. Alternatively, AL-PDUs are generated from H.245 signals by using AL1 of H.223. Each AL-PDU is used to generate bit steams through a multiplexer layer of H.223 and data is transmitted through a modem over a wireless network.

By using module(s) having the above-described construction (structure), audio data and image data for real-time video with decoration images (graphics) added thereto can be transmitted and received in real-time during video conference (i.e., video conferencing).

Figure 11:
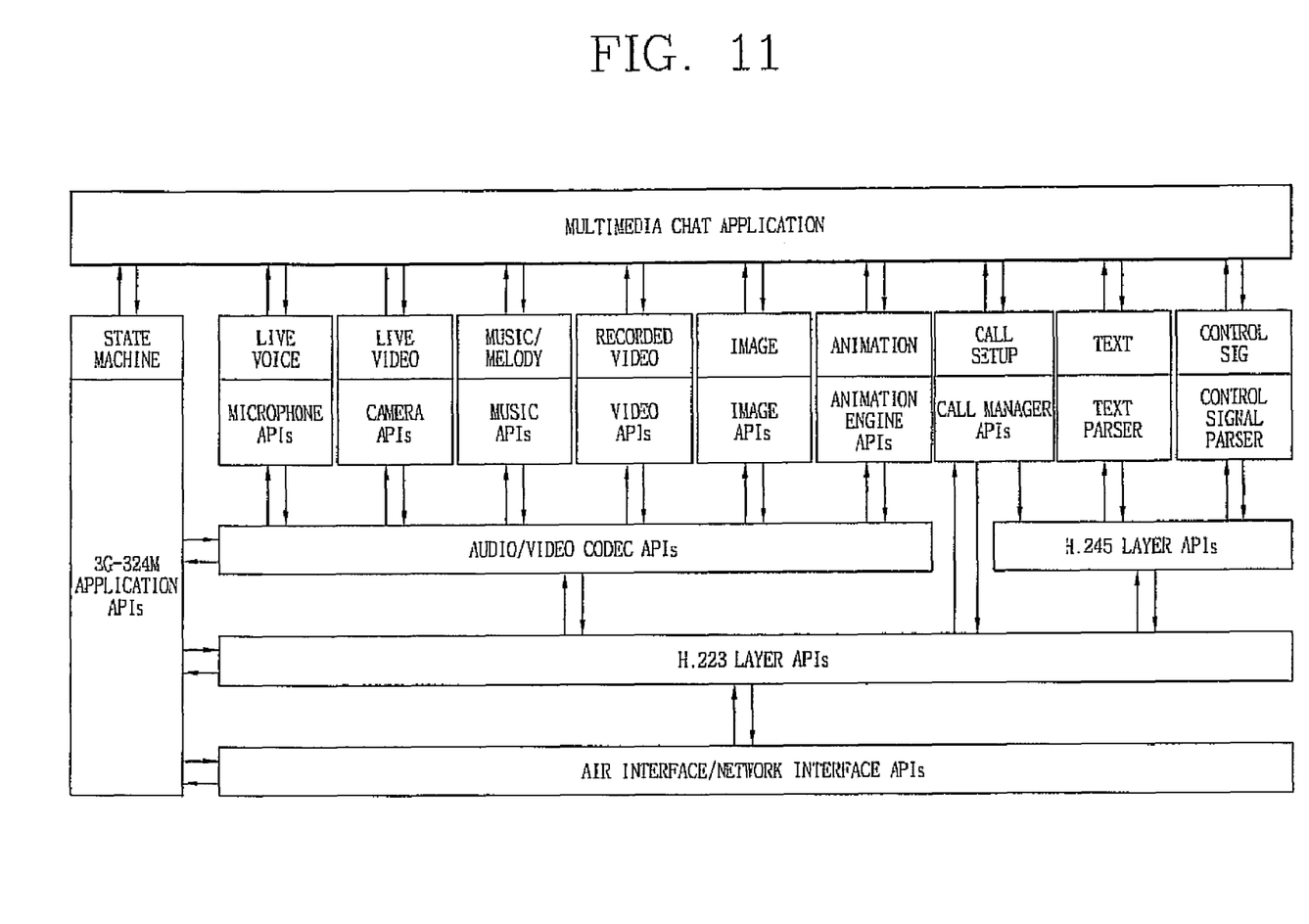
FIG. 11 is a block diagram showing an API architecture for communicating multimedia data while a video conference is in progress in accordance with one embodiment.

FIG. 11 is a block diagram showing an APT (Application Program Interface) architecture for communicating multimedia data, while video conference is in progress in accordance with one embodiment. As shown, an architecture of API is based on software of 3G-324M in order to implement multimedia-applicable video chatting. The APIs are defined with respect to data inputted during video conference. Here, the data is transmitted through the APIs of related layers. Audio/video data uses audio/video codec APIs, and the control signals use H.245 APIs. Call setup APIs are used to call the multiplexer APIs of H.245 and H.223.

Figure 12:
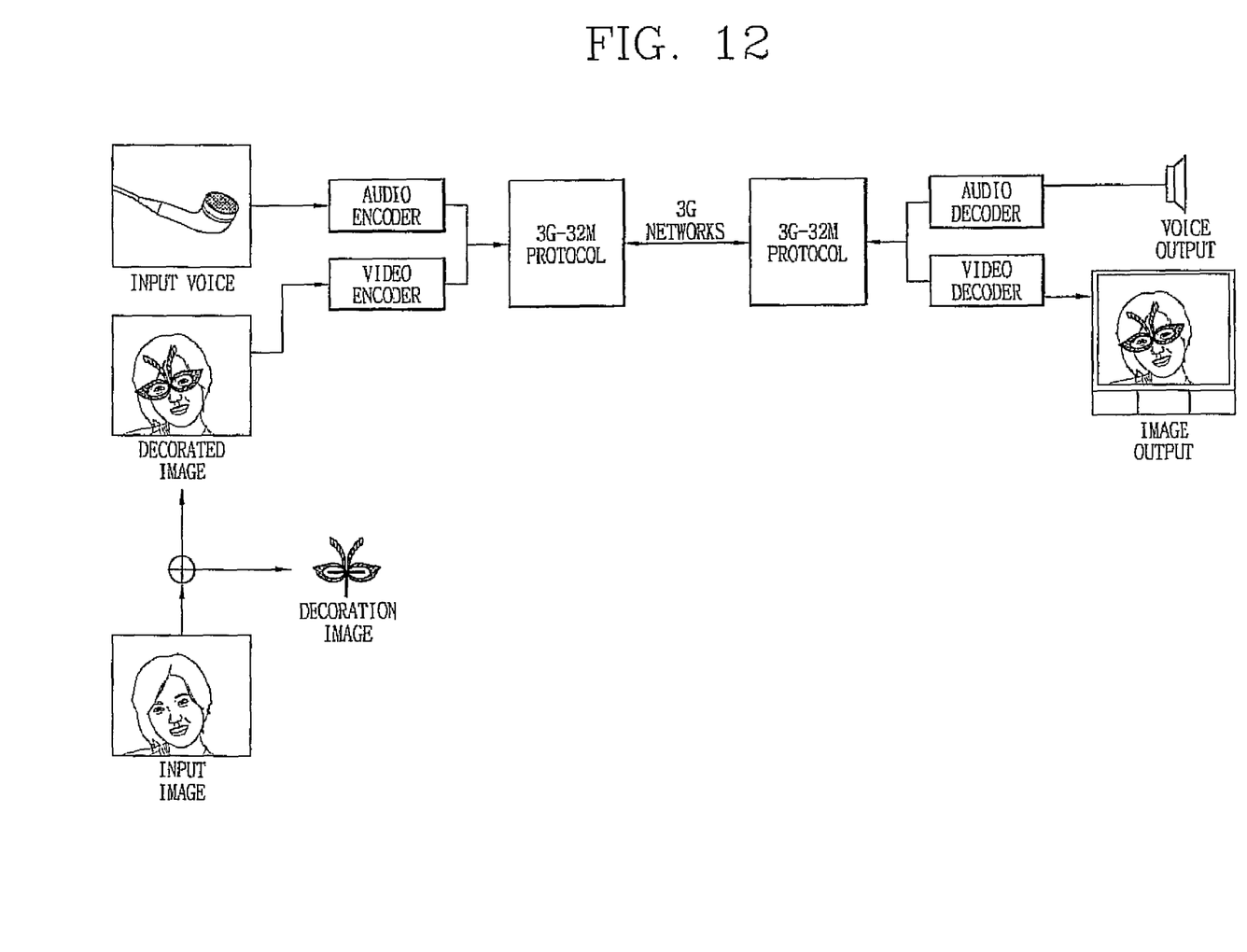
FIG. 12 is an exemplary view of applying a decoration image in a video conference protocol in accordance with one embodiment.

FIG. 12 is an exemplary view of applying a decoration image in a video conference protocol in accordance with one embodiment. As shown, synthesizing an image corresponding to a user's image with a decoration image may be performed preferably before transmitting a captured image to the video encoder cooperating with the video conference protocol. That is, in one embodiment, the receiving terminal does not perform a series of additional operations in order to view the real-time decorated images.

Figure 13:
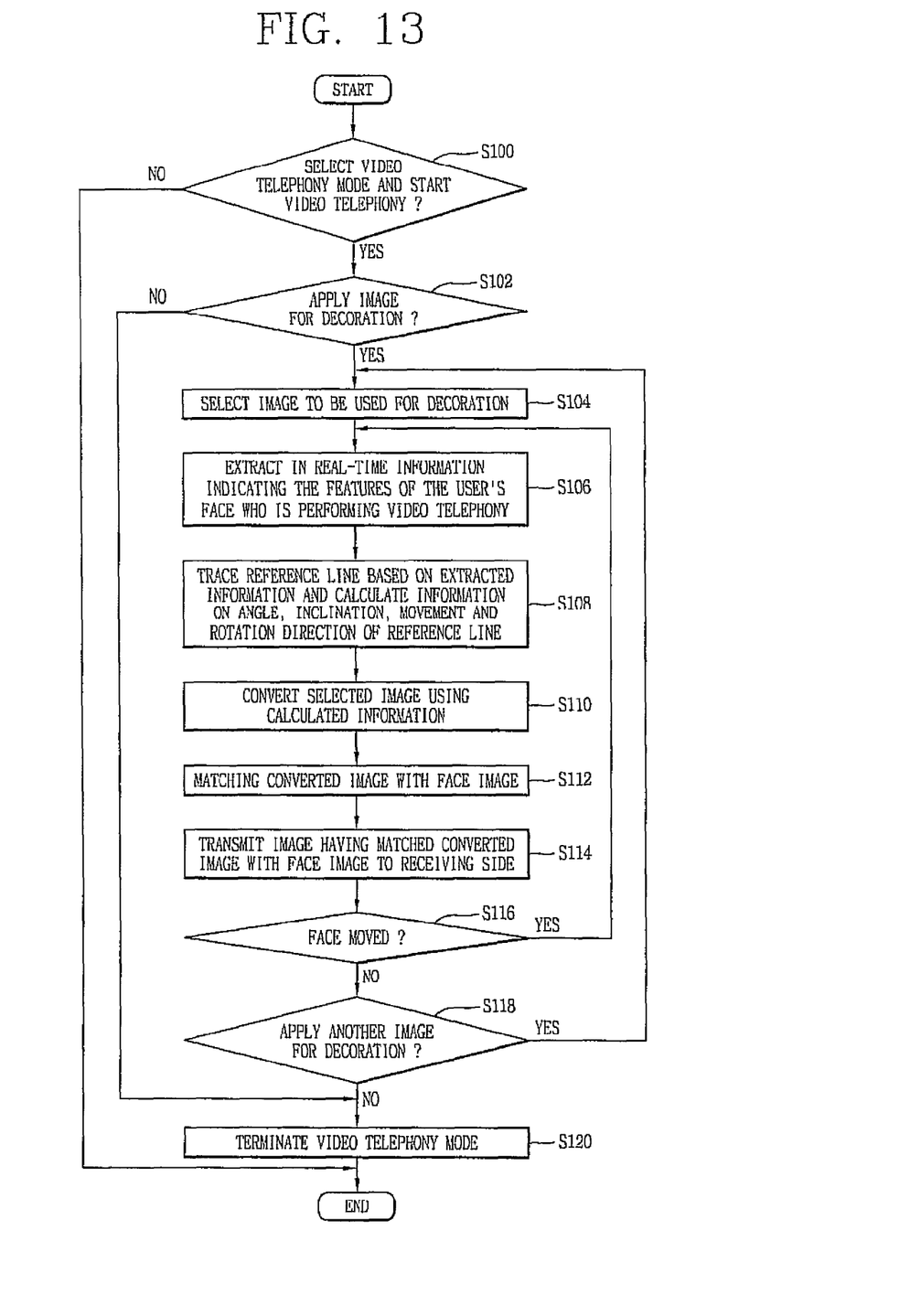
FIG. 13 is a flowchart showing a method of video conference in a mobile communications terminal in accordance with one embodiment.

FIG. 13 is a flowchart showing an exemplary method for video conferencing in a communications terminal in accordance with one embodiment. If a user desires to select a video conference mode and wished to decorate an image of his face using decoration images (e.g., masks, earrings, glasses, etc.) during video conference, the user selects a desired decoration image to be used (S100, S102 and S104). The user terminal extracts the shape of the user's face who is performing video conference by use of an image capturing unit such as a camera, and then extracts in real-time information indicating the features of the user's eyes, nose and mouth based on color, brightness or other information within a facial region (S106).

Upon extracting the information indicating the features of eyes, nose and mouth, the extracted information is used to identify and trace a reference area. The reference area is preferably marked by a cross like pointer that connects certain facial features (e.g., the eyes, the nose and the mouth). Information related to angle, inclination, movement and rotation direction of the extracted reference area is calculated (S108). As such, obtaining the reference area and calculating the information related to angle, inclination, movement and rotation direction of the reference area are continuously performed in real-time as the user moves his face.

After calculating the information related to the extracted reference area, the decoration image selected by the user in process S104 is changed or adjusted such that angle, inclination, movement and rotation direction are matched with those of the calculated information. When the user's face image and the decoration image are matched together, the combined image is then transmitted to a receiving side terminal (S112, S114).

While a video conference is in progress using the combined image, whenever the user moves (i.e., when the face image changes position), the user terminal recalculates the information indicating the features of the user's face image in real-time (S116 and S106).

If the user desires to apply another decoration image during the video conference, the system goes back to process S104 of selecting a decoration image to be used. Hence, when the user moves and results in changes to the image of his face and/or the user desires to select another decoration image, the steps S104 to S118 are repeatedly performed. When the user completes video conference, the terminal 4 conference mode.

Figure 14:
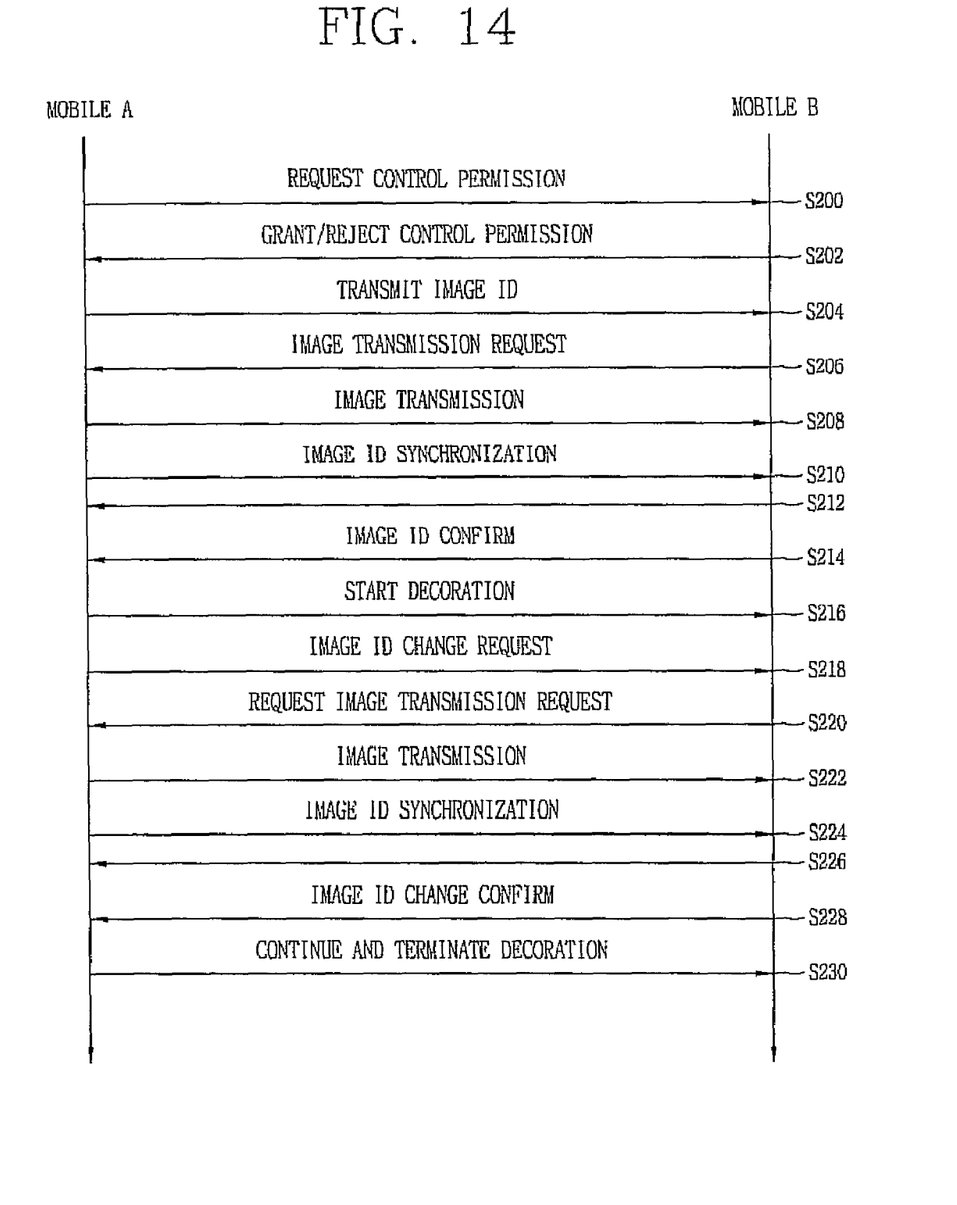
FIG. 14 is a signal flowchart showing a method for controlling an image of an opposing party's terminal in accordance with one embodiment.

FIG. 14 is a flowchart showing a method for controlling an image of a third party's terminal in accordance with one embodiment. Hereinafter, explanation will be given in detail of how a transmitting side terminal (referred to as 'terminal A') controls the decoration of a receiving side terminal (referred to as 'terminal B') in accordance with one embodiment.

If terminal B has no image to be used for decoration or a user of terminal B has not set an image decoration mode, a user of the terminal A can control terminal B to thus create decoration images for a currently displayed real-time image or video. In one embodiment, terminal A requests permission from terminal B in order to control the decoration image operations for terminal B (S200). If terminal B grants permission to terminal A, then terminal A may transmit an image ID to terminal B in order to check whether terminal B has an image which the user of terminal A desires to use for decoration (S202 and S204). Terminal B which received the image ID checks whether it has stored the corresponding image based on the ID received. If the corresponding image is not stored therein, terminal B requests terminal A to transmit the image thereto (S206).

In one embodiment, terminal A transmits the image to terminal B and terminal A is synchronized with terminal B (S208, S210 and S212). Upon completing synchronization between terminal A and terminal B, terminal B confirms the image ID received from terminal A and transmits the result of the confirmation to terminal A (S214). The user of terminal A may start to perform decoration image procedures on terminal B using the image transmitted to terminal B (S216).

If the user of terminal A desires to perform decoration using another image, terminal A transmits a command for requesting an image change into the ID corresponding to the another image to terminal B. Terminal B then checks the ID of another image received from terminal A, and if there is no image corresponding to the ID, terminal B requests transmission of the corresponding image from the terminal A (S218 and S220).

Upon receiving the image transmission request from terminal B, terminal A transmits the corresponding image to terminal B; and terminal A is preferably synchronized with terminal B for decoration image forming (S222, S224 and S226). Upon completing synchronization between terminal A and terminal B, terminal B transmits to terminal A an image ID change confirmation message.

The image ID change confirmation message indicates that the image for decoration has been changed into the another image transmitted by terminal A. Terminal A having received the image ID change confirm message may allow the user to continuously perform image decoration and finally terminates the image decoration procedure upon completion (S228 and S230).

As provided above, the protocols shown in FIG. 8 may be used as protocols for transmitting the images to be used for image decoration by controlling another terminal and also for controlling synchronization.

In one embodiment, the series of operations performed between the transmitting terminal and the receiving terminal are performed in each of terminal concurrently. Furthermore, the presently described features may be applicable to still images (such as photos) as well as moving images (such as video clips) obtained (captured) during video conference.

As described above, the features of this disclosure can be used to decorate the user's face image with added graphics (e.g., still images, animation, etc.) in real-time even if the user moves his head during video conference. This may be achieved by extracting information related to facial features of the user (e.g., eyes, nose, mouth) during a video conference session, and tracking a reference area based on the extracted information, and synchronizing the reference area with a respective area in the decoration image.

A receiving terminal may not be equipped with a function for performing image decoration during video conference or have no image to be used for the decoration. In one embodiment, if a user of the receiving side terminal has granted permission for image decoration and image control, a user of a transmitting side terminal can transmit images to the receiving side terminal and perform appropriate control operations to enable image decoration for video conference.

In certain embodiments, features described herein may be implemented with various types of real-time face tracking software and hardware. Adjusting the decoration image for tracking and synchronization with the user's face image movements may be achieved by calculating a conversion matrix based on various factors such as, image movement, rotation, gradient, image scaling, and the like.

For combining or overlaying the decoration image with the captured user's image, a color masking method may be used. If the decoration image contains image transparency information or if the image processing application requires image transparency adjustment, blending may be performed with color masking to achieve image transparency visual effects.

The contents of the decoration image may be in many formats, such as images (jpg, gif, bmp, tiff, etc.), animation clips (animated gif, flash, etc.), video clips (mp4, etc.) and equivalents thereof.

In the 3G-324M video conference protocol, the user input indication field of the H.245 protocol (that handles call control) can be used to allow real-time interaction between terminals. Namely, the control protocol among the video conference protocols may be used by one user to control the decoration image procedure on a terminal of a different user. For example, DTMF (Dual Tone Multi Frequency) which may be used for transmitting user keypad inputs, video conference, simple user defined symbol transmissions, and the like, can be supported by using certain fields (e.g., User Input Indication::alphanumeric field, User Input Indication::Non-standard Parameter field).

Non-standard parameters of the user input indication field of the H.245 protocol that handles call control in the 3G-324M protocol can be used to transmit image decoration adjustment symbols between terminals. If separate decoration images are to be transmitted, the data protocol of the 3G324M protocol may be employed.

The features in this disclosure provide a video conferencing method. The method comprises detecting certain facial features from a captured facial image of one user; synchronizing a decoration image with the detected certain facial features, such that the decoration image matches and follows any movements in the captured facial image; forming a combined image upon graphically adding the decoration image to the captured facial image according to the synchronizing; and transmitting the combined image to another user to perform video conference.

The detecting may be performed by comparing at least one of the following: the color, the brightness, or the tone contrast that indicate a location of a certain facial features of the captured facial image. The synchronizing may be performed by graphical image processing techniques that consider at least one of the following: a movement, a rotation, a gradient, or an image scaling related to the detected facial features in the captured facial image. The forming may be performed by graphical image processing techniques that employ at least one of an image color masking, image color blending, and image transparency control for the decoration image and the captured facial image.

The transmitting may be performed by using any communication protocol. These steps may be repeatedly performed in real-time during video conference. These steps may be initiated by one user for his own terminal or the steps may be initiated by one user for a terminal of another user via remote access using a call control protocol and/or a data control protocol upon authorization from the another user.

The features described herein may be implemented as software, hardware, or a combination thereof in various types of technologies, such as WCDMA networks, HSDPA (High-Speed Downlink Packet Access) networks, or functional or structural equivalents thereof.

As the present features may be embodied in several forms, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
   capturing a facial image during video telephony;
   extracting a facial shape from the captured facial image and determining facial objects within the extracted facial shape;
   tracing a reference line formed by straight lines connecting between the facial objects;
   calculating information related to the traced reference line; and
   synchronizing a decoration image with the captured facial image by matching a reference line of the decoration image with the traced reference line according to the calculated information,
   wherein the traced reference line is varied in real time according to a user's movements during the video telephony.

2. The method of claim 1, wherein the determined facial objects include eyes, nose and mouth.

3. The method of claim 2, wherein the reference line has a T-shape obtained by connecting the eyes, nose and mouth.

4. The method of claim 1, wherein the determined facial objects are extracted based on brightness, color and portions of the extended facial shape.

5. The method of claim 1, wherein the information includes one or more of angle, movement, inclination and rotation direction of the reference line.

6. A mobile terminal comprising:
   a capturing unit configured to capture a facial image during video telephony;
   a tracing unit configured to:
      trace a reference line from the captured facial image;
      extract a facial shape from the captured facial image;
      determine facial objects within the extracted facial shape;
      trace a predetermined shaped reference line formed by straight lines connecting between the facial objects; and calculate information related to the traced reference line; and a synchronizing unit configured to synchronize a decoration image with the facial image by applying the calculated information to a reference line of the decoration image, wherein the traced reference line is varied in real time according to a user's movements during the video telephony.

7. The terminal of claim 6, further comprising a memory that stores the decoration image.

8. The terminal of claim 6, wherein the facial objects include eyes, nose and mouth.

9. The terminal of claim 8, wherein the reference line has a T-shape obtained by connecting the eyes, nose and mouth.

10. The terminal of claim 6, wherein the synchronizing unit is further configured to extract the facial objects based on brightness, color and portions of the facial shape.

11. The terminal of claim 6, wherein the information includes one or more of angle, movement, inclination and rotation direction of the reference line.

12. A method for controlling an image in a mobile communications terminal, the method comprising:

requesting, from a first terminal, authority for controlling a decoration of a captured image to a second terminal;

transmitting an image to the second terminal when the request is granted, the image to be used for decoration during video telephony; and controlling the second terminal and synchronizing the transmitted image with the capture image in the second terminal.

13. The method of claim 12, wherein synchronizing the transmitted image with the capture image comprises:

extracting features of a face of a user of the second terminal during video telephony;

tracing a reference line indicating a geometrical form of the face based on the extracted features;

calculating information related to the traced reference line;

synchronizing the face with the image to be used for decoration of the face; and synthesizing the face and image based on the information of the reference line.

14. The method of claim 13, wherein the information includes one or more angle, movement, inclination, movement, rotation direction of the reference line.

15. The method of claim 12, wherein the features of the face include eyes, nose and mouth.

16. The method of claim 15, wherein the reference line has a T-shape obtained by connecting the eyes, nose and mouth.

17. The method of claim 15, wherein further comprising:

transmitting a command for requesting an image change to the second terminal when decoration using a different image is necessary; and receiving an image change confirm message indicating that the image for decoration has been changed into the different image transmitted by the first terminal.

* * * * *